UNITED STATES PATENT OFFICE.

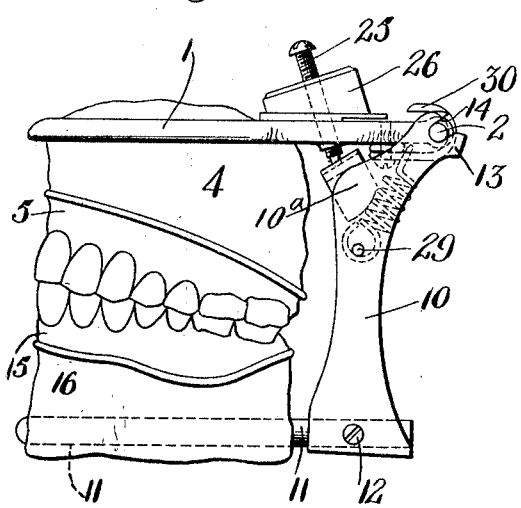
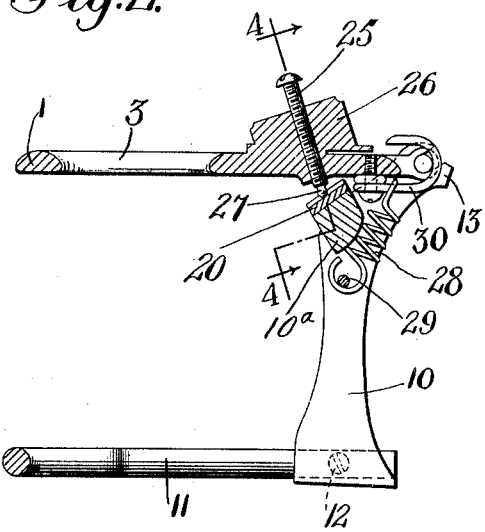
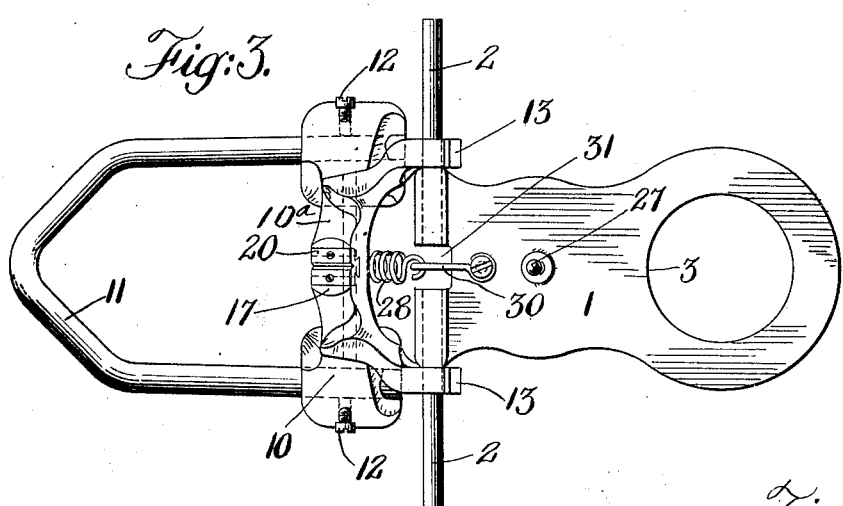
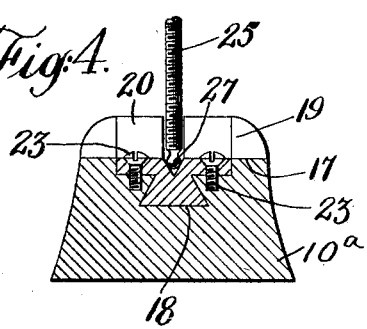

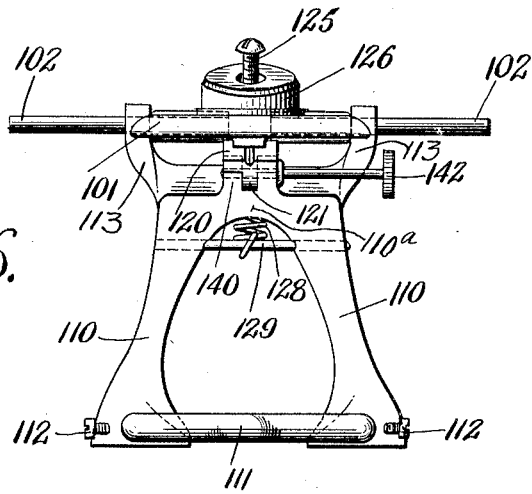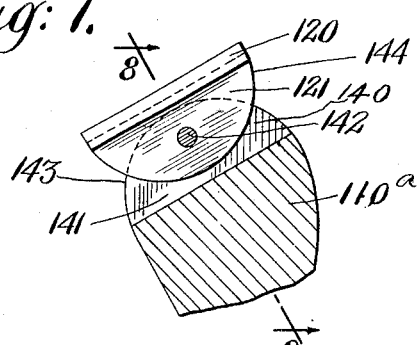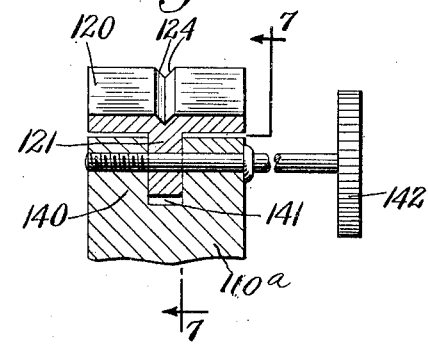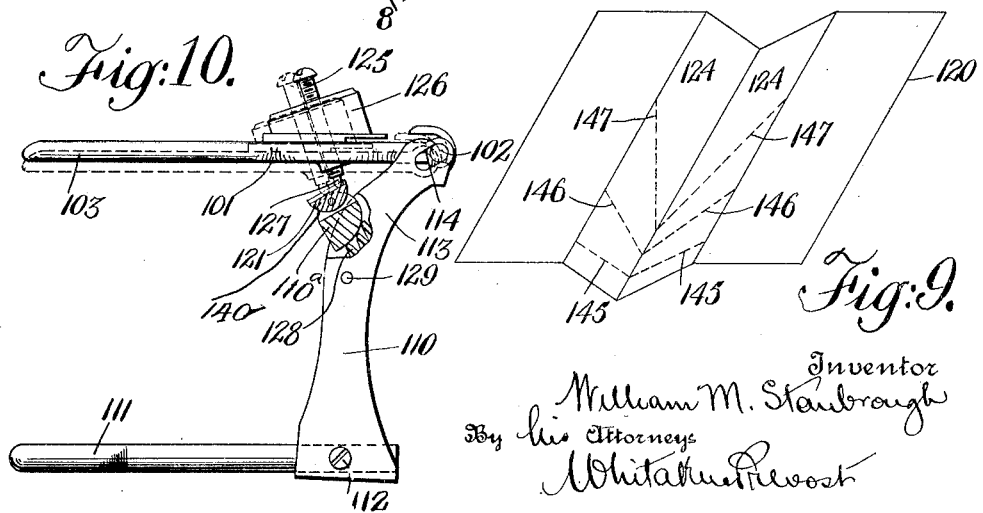

WILLIAM MONELL STANBROUGH, OF NEWBURGH, NEW YORK.

DENTAL ARTICULATOR.

1,343,691.   Specification of Letters Patent.   Patented June 15, 1920.

Application filed January 21, 1919. Serial No. 272,256.

*To all whom it may concern:*

Be it known that I, WILLIAM M. STANBROUGH, a citizen of the United States, residing at Newburgh, in the county of Orange and State of New York, have invented certain new and useful Improvements in Dental Articulators; and I do hereby declare the following to be a full, clear, and exact description of the invention, such as will enable others skilled in the art to which it appertains to make and use the same.

My invention consists in the novel features hereinafter described reference being had to the accompanying drawing which illustrates one embodiment of the invention selected by me for purposes of illustration, and my said invention is fully disclosed in the following description and claims.

The object of my invention is to provide a dental articulator in which artificial teeth plates or bases may be supported in the same relation to each other that they will occupy when placed in the mouth of the patient for whom they are intended, and so positioned as to give the artificial teeth approximately the position of the natural teeth, with special reference to the lateral compensating curve and also the fore and aft compensating curve or "curve of Spee," the articulator providing for the lateral and fore and aft mandibular movement with respect to two separate rotation points corresponding to the condyles of the human jaw, the members of the articulator being normally held in a centered position with the upper and lower dentures in occlusion, and means being provided for imparting to the mandibular member during its lateral and fore and aft movements, motions corresponding with predetermined angular relation of the desired cusp faces of the teeth, whereby the occlusal faces of the teeth may be accurately ground. My invention also contemplates means for varying the lateral mandibular movements, as well as the fore and aft mandibular movements, to accommodate and assist in grinding dentures having cusp angles of different degrees, so that any desired inclination of the cusp faces can be accommodated and ground.

In the preferred form of my invention, which is herein illustrated, the means for positioning and regulating the movement of the mandibular member is located between the outer extremities of the jaw members and the pivotal connections between them, and relatively close to the pivotal connections, which enables the user to obtain greater grinding effect with materially less effort, and also contributes to the advantageous results before enumerated.

The formation of more sharply angular cusps, which is possible with my improved articulator, results in reducing the mandibular excursion and greatly increases the cutting qualities and grinding effectiveness of the teeth.

Referring to the accompanying drawing,

Figure 1 is a side elevation of a dental articulator embodying my invention and selected by me for the purpose of illustrating the invention.

Fig. 2 is a central vertical sectional view of the same.

Fig. 3 is a plan view of the articulator as it would appear with the lower jaw member in horizontal position and the upper jaw member rotated backward and exposing the under surface thereof.

Fig. 4 is a sectional view on the line 4—4 of Fig. 2.

Fig. 5 is a detail view of one form of detachable wear plate which I may employ in connection with the apparatus.

Fig. 6 is a front elevation of my improved articulator showing a modification of the jaw positioning and governing means.

Figs. 7 and 8 are enlarged detail views showing the adjustable inclined plate and the means for holding it in adjusted position.

Fig. 9 is an enlarged diagrammatic view of the governing and centering cam faces illustrating the change in the angularity of the cam path effected by the adjustment of the plate.

Fig. 10 is a side elevation of the articulator, partly in section, illustrating the manner in which the condyle tracks and the inclined cam faces effect the separation of the jaw members during back and forth mandibular movements, the separated position of the lower jaw being illustrated in full lines, and the normal position in dotted lines.

In the form of my invention illustrated in Figs. 1 to 5 inclusive of the accompanying drawings, 1 represents the upper jaw member of the articulator, which may be of any desired form, either as a plate or bow, and is provided on its rear end with laterally projecting pivot bars 2—2 forming part of the pivotal connections between the jaws and preferably extending laterally sufficient distances to coöperate readily with the ordinary face bow used in making measurements from the face for artificial dentures. In the present instance the jaw member 1 comprises a plate, the outer end portion of which is provided with an aperture 3 forming a loop or bow to facilitate the application of a plaster cast, indicated at 4 in Fig. 1, to which the upper denture, indicated at 5, is secured in the usual manner. The lower jaw member or mandibular member preferably comprises a casting of substantially H-form having two vertically disposed portions 10 connected by a horizontal bridge or strut 10ª, and a horizontally disposed bow 11 which normally occupies a position parallel with the upper jaw member. The ends of the bow 11 preferably frictionally engage apertures in the lower portions of the vertically disposed portions 10 so as to be adjustable lengthwise of the bow and may be held in place by driving the bow to the proper position, or the ends of the bow may be adjustably secured by means of set screws, as indicated at 12, if desired. The upper portions of the vertically disposed parts 10 of the lower jaw casting extend above the bridge or strut 10ª and form separated arms 13, which are provided with inclined slots 14 in this instance open at their rear ends, which embrace the pivot rods 2—2 of the upper jaw member and form therewith the pivotal connections between the two jaws. These inclined slots which are preferably formed at an angle of approximately 35° to the horizontal, approximate the angle of the condyles of the human jaw and provide for the fore and aft mandibular movements and for the lateral mandibular movement, centering about the two separated rotation points, to wit, the points of contact between the slotted arms 13 and the pivot rods 2. It will be understood that the lower denture indicated at 15 in Fig. 1 will be supported on a suitable plaster base 16 which is supported by and secured to the bow 11 of the lower jaw member.

I provide means for positively controlling the relative positions of the jaw members, when at rest, and during the mandibular movements with the teeth in occlusion, which comprise supporting surfaces connected with one jaw, and provided with cam faces forming a depression, notch, or recess, said cam faces having a configuration approximately conforming to the relation of the angular cusp faces of the teeth, the occlusal surfaces of which are to be articulated and ground, and being disposed angularly from front to rear with the planes of the denture supporting members of the jaws, these cam faces coacting with a projection, preferably adjustable, carried by the other jaw member and having a bearing portion which rests in the recess, depression, or notch formed by said cam faces when the jaw members are in the proper centered relation or "bite" relation, and which rides upon said cam faces during the lateral mandibular movements, so as to impart the proper movement to the lower member, and which rides backward and forward along the groove notch or depression formed by said cam faces, during the backward and forward mandibular movements to impart movements to the lower jaw member, to conform to the angularity of the cusps of the particular dentures mounted in the articulator, both laterally and fore and aft, and holding the jaw member and the dentures carried thereby centered with respect to each other during the fore and aft mandibular movement, and the occlusal faces of the dentures in occlusion when the jaw members are in normal position.

In the embodiment of my invention which is illustrated in Figs. 1 to 5 inclusive of the accompanying drawings, the supporting surface and adjustable projection above referred to are located between the outer extremities of the jaw members and their points of pivotal connection, and preferably closely adjacent to and on a median line between said rotation points, as shown in the drawing, and I also prefer to provide the bearing surface of the lower jaw member and the adjustable projection on the upper jaw member for convenience, although I do not desire to limit myself to this arrangement. In this embodiment of my invention the bridge or strut 10ª of the lower jaw member is provided at a point slightly forward of the slots 14 and on a median line between the slotted arms 13 with an inclined face 17 which is preferably provided with a dove-tailed slot 18 at the bottom of a recess 19 for the purpose of receiving a detachable bearing plate 20, indicated in detail in Fig. 5, which is provided with a dove-tailed portion 21 to fit the dove-tailed slot 18, the plate 20 being adapted to fit in the upper recess 19, and being provided with apertures 22 to receive retaining screws 23 for holding the plate rigidly in position. The bearing plate 20 is provided on its upper surface with cam faces 24 forming a depression, recess, groove, as the case may be, the said cam faces extending upwardly from their point of union in a curved or inclined position, and having a relation to each other corresponding to the curved or angular relation of the occlusal faces of the teeth cusps, that is to say, the said cam faces having such relation to each other as will impart to the lower jaw member during its lateral mandibular movements, such motion away from the upper jaw member as will maintain the occlusal faces of the teeth of the upper and lower dentures in occlusion during such lateral movement and permit of the grinding of these occlusal faces to a perfect fit while preserving their angular relation. The face 17 and the upper face of the wear plate 20 is disposed angularly with respect to the portion 11 of the lower jaw member, which carries the denture, and inclines downwardly and forwardly from rear to front at substantially the same angle as that of the slots 14, as clearly shown in Figs. 1 and 2. It follows therefore that if backward and forward movement is imparted to the lower jaw member, which can be accomplished, for example, by holding the lower jaw member in both hands and pressing with the thumbs on the pivot rods of the upper jaw member, the projection on the upper jaw member will ride up and down in the inclined groove or notch formed by or between the cam faces 24, and will cause a relative separation of the jaw members as the lower jaw moves forward, and a return to normal position as it moves backward, corresponding to the angles of the cusp faces extending backward and forward in the denture, and enabling them to be accurately ground so as to bring them into occlusion while preserving their angularity.

The upper jaw member is provided in this instance with a projection in the form of a screw 25 extending through a threaded aperture in a boss 26 provided on the upper jaw member, said screw having a very fine thread for substantially microscopic adjustment, and preferably having at its lower end a hardened curved bearing surface formed in this instance by the provision of a substantially spherical end portion 27 to engage the bearing plate or wear plate 20, which is also preferably hardened to prevent wear of the contacting parts. The axis of the screw or projection 25 is at an angle to the plane of that portion of the upper jaw member which carries the denture connected therewith and is preferably disposed at an angle to a line perpendicular with the face of the wear plate 20, so that if the mandibular excursion is sufficient to carry the projection beyond the upper edge of the cam faces 24, it will engage and ride upward on the inclined upper face portion of the wear plate 20.

It will be obvious that the lower end of the projection or screw 25 will naturally seat itself in the depression, recess or groove formed by the cam faces 24 and the parts are so constructed that this seating of the projection in said depression takes place when the jaw members are centered with respect to each other. The dentures will be so placed in the upper and lower jaw members, as indicated in Fig. 1, that the dentures will be in occlusion when the upper and lower jaw members are so centered. It will also be seen that by effecting lateral mandibular movements, with the jaws held yieldingly in this position, the projection carried by the upper jaw member will be caused to ride upward upon the cam faces 24 in one direction or the other, and on the inclined faces of the wear plate 20 if it passes beyond said cam faces, in conjunction with the slotted pivotal connections before described, imparting to the lower jaw member a mandibular movement similar to that of the human jaw, and permitting a slight separation of the jaw members which will conform to the desired cusp formation, and maintain the occlusal faces of the dentures in contact. It will also be seen that in the fore and aft movements of the lower jaw member the inclined condyle slots 14, and the travel of the projection 27 back and forth in the groove in the rear plate between the cam faces 24 will hold the jaw members centered while effecting a movement of the lower jaws away from and toward each other conforming to the angularity of the cusp faces of the dentures in a fore and aft direction.

I prefer to provide a spring or other yielding connection between the upper and lower jaw members for holding the projection and bearing plate in yielding contact, and the effect of this spring will be to secure at all times the centering of the upper and lower jaw members with respect to each other, as it forces the projection to enter the recess or depression between the cam faces 24, and to return to this position whenever the lower jaw member has been moved laterally in either direction with respect to the upper jaw member, and also holds the jaws in position with the pivot rods 2 at the inner extremities of the condyle slots 14. Any desired form of spring may be employed, and in fact good results can be obtained by means of a rubber band surrounding the jaw members and pressing them yieldingly toward each other. I prefer, however, to employ the spring 28 as shown in the drawings, the lower end of the spring being connected to a cross bar 29 carried by the vertically disposed portions 10 of the lower jaw member, and the upper end of the spring being connected to a curved hook-shaped bar or rod 30 secured to the under side of the upper jaw member adjacent to the axis of the pivot rods 2—2 and curving upwardly and forwardly around said pivotal axis, as shown in Figs. 1 and 2, a portion of the plate member being cut away, as indicated at 31, to allow the upper end portion of the spring to slide on the hook-shaped bar 30 when the jaw members are separated at a considerable angle or when the upper jaw member is folded over inwardly in the position indicated in Fig. 3, for example, for convenience in giving access to the lower jaw member in setting the dentures. This is merely a matter of convenience, and it will be further observed that by turning the upper jaw member over backward, the upper end of the spring can be detached from the free end of the hook member 30 to permit the jaw members to be entirely disassociated and replaced in proper pivotal connection when this becomes desirable.

It will be understood that when a pair of dentures have been properly positioned in the jaw members, as indicated in Fig. 1, in proper relation with the axis of their pivotal connections, as determined by measurements taken from the patient, and in proper relation with each other, the cusps of the occlusal surfaces of the teeth can be very accurately ground by applying thereto abrasive material and imparting lateral and fore and aft mandibular movements to the apparatus until a perfect occlusion of the teeth is obtained. By locating the bearing plate and projection which govern the mandibular movement closely adjacent to the pivotal connections, the said movements can be effected with a minimum of exertion of force, and the grinding therefore proceeds rapidly and easily by reason of the increased leverage afforded in moving the lower jaw member with respect to the upper jaw member, or vice versa, the movement being imparted either by the application of pressure to the outer end of either jaw member while the other is held stationary, or by holding the lower jaw member stationary and applying pressure to the outer ends of the pivot rods 2, or the movements may be obtained in any other desired manner. In addition to the adjustability of the screw or projection 25, it will be understood that the bearing plate 20 or wear plate may be removed and a different plate substituted having a different character of cam faces 24 either curved or inclined and approaching each other at a different angle or in a different manner, according to the character of the teeth cusps employed, and which it is desired to grind, and I have found in practical experience with this apparatus that teeth having sharply angular cusps can be efficiently articulated and ground without the slightest difficulty and the device can be readily adapted for the articulation and grinding of teeth having a wide variety of cusps, according to the requirements of the dentures which are being prepared. The device is extremely simple in construction and operation and its results are extremely accurate and efficient.

It will be understood that if the teeth of the dentures as originally set up and assembled are provided with cusp angles which are substantially those desired and the apparatus is adjusted to grind those angles, the cusp faces will be accurately ground and the teeth of the dentures brought into occlusion. It will also be understood that if the cusp formation of the artificial teeth employed only approximates the desired angular cusp relation for which the apparatus is set or adjusted, the meeting faces of the teeth will be ground away until angular faces of the desired angularity, both lateral and fore and aft are produced on the artificial teeth, and said angular faces brought into perfect occlusion.

In Figs. 6 to 10 inclusive I have illustrated a slight modification of my invention in which instead of providing for removing and replacing the wear plate carrying the inclined or angularly disposed cam faces, I provide an adjustable wear plate having inclined faces forming a groove or notch between them, and so arranged that by varying the angularity of this plate the angle of the back and forth travel of the projection and also the angle between the paths of travel of the projection on the cam faces can be altered to a considerable extent without removing the wear plate and replacing it with another. In these figures 101 represents the upper jaw member provided with the pivot rods 102 and the bow portion 103 for receiving the base of the upper denture. 110 represents vertically disposed portions and 110ª the bridge or strut of the casting forming the main body of the lower jaw member provided with the bow 111 adjustably secured by set screws 112, the upper portions of the vertically disposed portions 110 of the casting forming the rearwardly extending arms 113, having the inclined condyle slots 114 engaging the pivot rods 102, the jaw members being held yieldingly in their normal positions by the spring 128, all as previously described with reference to Figs. 1 to 5 inclusive. In this embodiment of my invention, the bridge or strut 110ª is provided with a boss 140 having formed therein a kerf or recess 141 to receive a downwardly projecting blade 121 on the angular wear plate 120, which fits in the kerf or recess and is adapted to be rigidly clamped therein by means of a clamping screw 142, as clearly shown in Fig. 8, which clamps the portion of the boss 140 on opposite sides of the kerf or recess rigidly upon the depending blade 121. The front and rear faces of the boss 140 are preferably curved, as indicated at 143, and the front and rear edges of the blade 121 are also curved, as indicated at 144, so as to permit the wear plate 120 to be adjusted to a wide range of angles with respect to the plane of the denture holding portions of the jaws. The wear plate is provided with a centrally located groove extending from front to rear and formed by the cam faces 124.

It will be understood that by adjusting the angle of the wear plate 120 two results will be accomplished, first the effect of the cam faces 124 on the projection 127 which extends from the upper jaw member will be varied and will change the relative movements imparted to the jaws during the lateral mandibular movements, and secondly the travel of the projection backward and forward in the groove formed by the cam faces 124 will also cause a different relative movement to be imparted to the jaws during the backward and forward mandibular movement, according to the angularity of the plate 120. In Fig. 9 I have shown diagrammatically the effect of the tilting of the plate 120 to different angles on the travel of the projection 127 across the cam face 124 during the lateral mandibular movements in order to illustrate this action more clearly. Thus, for example, if it be supposed that the projection 127 of the screw 125 is disposed substantially perpendicular to the plate 120, the travel of the projection on the cam faces 124 would be illustrated by the dotted lines 145—145 and the effect of the cam faces would be to produce angular movements corresponding substantially to the precise angular relation of the cam faces 124 to each other. If, however, the plate 120 is tipped slightly forward to increase its angularity, and secure it in that position, it would follow that the projection 127 would take paths on the cam faces 124 illustrated for example, by the dotted lines 146—146 and the actual angularity of these paths 146—146 with respect to each other would be more acute than the angle formed by the paths 145—145. If the plate 120 is adjusted still more sharply forward, for example, the projection 127 would follow paths indicated by the dotted lines 147—147, the angularity between which paths would be still more acute. This diagram Fig. 9 will serve to illustrate the manner in which the adjustment of the plate 120 has the effect of changing the angular relation of the paths of the projection 127 on the cam faces 124 during lateral mandibular movements, without in fact changing the wear plate itself, and it will of course be readily understood that in the fore and aft movements, the angle of the plate will directly effect the movements of the jaws with respect to each other during the fore and aft mandibular movements. With this construction it will be apparent that the dentures can be ground with cusps of various angularities both laterally and backward and forward, and it will also be understood that it is not necessary that the same position of the wear plate 120 should be maintained during the lateral and fore and aft mandibular movements. For example, the articulator can be set by adjusting the plate 120 as desired for grinding the cusp faces during the lateral mandibular movements, and then the wear plate 120 can be set in a different position if desired, so as to impart the desired angle to those cusp faces which extend backward and forward. It will be seen that in all fore and aft mandibular movements the groove or notch formed by the faces 124 will act as a guideway to maintain the jaw members centered with respect to each other during such movement and thus insure the accurate grinding of the cusps.

In Fig. 10 I have illustrated a side elevation of the articulator partly in section and have shown in dotted lines the position of the lower jaw brought about by the inclined condyle slots and the inclined groove in the wear plate during a forward excursion of the mandibular jaw member, which I have somewhat exaggerated in order that this operation may be clearly understood.

It will be seen that by removing the screw 142 the wear plate can be removed and another plate having a different form of cam faces 124 and groove inserted in lieu thereof, as in the form of my invention shown in Figs. 1 to 5 inclusive, although a variety of adjustments to meet different conditions can be obtained by the adjustment of the wear plate without removing and replacing the same with another, in the form shown in Figs. 6 to 10 inclusive.

As heretofore stated, I do not limit myself to the exact construction illustrated in the preferred embodiment of my invention selected by me for the purpose of illustrating the invention and herein shown and described, as mechanical variations in the same may be made within the scope of the following claims, without departing from the spirit of my invention.

What I claim and desire to secure by Letters Patent is:—

1. In a dental articulator the combination with upper and lower jaw members, and pivotal connections between said members permitting fore and aft mandibular movements, of a supporting surface connected with one jaw member provided with an inclined centering groove extending fore and aft with respect to said jaw members and being inclined vertically from front to rear, and a part connected with the other of said jaw members for engaging said groove and sliding longitudinally thereof during fore and aft mandibular movements, whereby said jaw members are caused to move away from and toward each other by said fore and aft mandibular movements while being positively centered and guided in such movements, to effect an accurate grinding of inclined opposed tooth faces disposed transversely to the line of said fore and aft movement.

2. In a dental articulator the combination with the upper and lower jaw members and pivotal connections between said members, permitting fore and aft mandibular movements, and coacting inclined condyle surfaces corresponding with the condyles of the human jaw for effecting a movement of said jaw members away from and toward each other by the fore and aft mandibular movement, of a supporting surface on one of said jaws provided with a centering groove extending in fore and aft with respect to said jaw members and being inclined vertically from front to rear, and a part on the other jaw member for engaging said groove and sliding longitudinally thereof during fore and aft mandibular movements, to coöperate with the said condyle surfaces in effecting jointly therewith a relative movement of the jaws away from and toward each other by said fore and aft mandibular movements while holding said jaws truly centered, to effect an accurate grinding of inclined tooth surfaces disposed transversely to the line of said fore and aft movement.

3. In a dental articulator the combination with upper and lower jaw members, and pivotal connections between them permitting fore and aft, and lateral mandibular movements, of a supporting surface connected with one of said jaw members, provided with an inclined centering groove, and lateral cam faces on opposite sides thereof inclined fore and aft and laterally said surfaces and groove extending fore and aft with respect to said jaws, and being inclined vertically from front to rear, and a part connected with the other jaw member, for engaging and sliding longitudinally of said groove during fore and aft mandibular movements, and having a sliding engagement with said inclined lateral cam faces during lateral mandibular movements whereby movements of said jaws away from and toward each other will be effected by the lateral and fore and aft mandibular movements and whereby said groove acts to hold said jaws in centered relation at all times during fore and aft movement, and at a conclusion of all lateral mandibular excursions.

4. In a dental articulator, the combination with upper and lower jaw members and pivotal connections between them permitting fore and aft mandibular movements, of a supporting surface connected with one of said jaw members, provided with an inclined centering groove extending fore and aft with respect to said jaws, and being inclined vertically from front to rear, and a part connected with the other jaw member for engaging and sliding longitudinally of said groove during fore and aft mandibular movements, whereby said groove acts to hold said jaws in centered relation at all times during fore and aft movement, and by its inclination causes said jaws to move away from and toward each other during such fore and aft movement, to effect the grinding of the inclined faces on the teeth held in such jaws, and disposed transversely to the line of such fore and aft movement, and means for varying the angularity fore and aft of said centering groove to vary the angularity of the tooth faces to be ground.

5. In a dental articulator the combination with upper and lower jaw members, and pivotal connections between them permitting fore and aft, and lateral mandibular movements, of a supporting surface connected with one of said jaw members, provided with an inclined centering groove, and lateral cam faces on opposite sides thereof inclined fore and aft and laterally said surfaces and groove extending fore and aft with respect to said jaws, and being inclined vertically from front to rear, and a part connected with the other jaw member, for engaging and sliding longitudinally of said groove during fore and aft mandibular movements and having a sliding engagement with said inclined lateral cam faces during lateral mandibular movements, whereby movements of said jaws away from and toward each other will be effected by the lateral and fore and aft mandibular movements and whereby said groove acts to hold said jaws in centered relation at all times during fore and aft movement, and to hold it centered at the conclusion of all lateral mandibular excursions and means for varying the angularity fore and aft of the said centering groove, and lateral cam faces, to vary the angularity of the tooth faces to be ground.

6. In a dental articulator, the combination with upper and lower jaw members, and separate pivotal connections between said members, provided with means for permitting lateral and fore and aft mandibular movement, of a supporting surface connected with one of said jaws and located at a point between its outer extremity and said pivotal connections, and disposed angularly to the plane of the denture supporting portions of said jaws, said supporting surface having laterally extending guiding cam faces forming a fore and aft inclined centering groove between them, and a guiding projection carried by the other jaw member and located between its outer end and said pivotal connections, for engaging said cam faces, and said projection being guided in said centering groove during fore and aft mandibular movements.

7. In a dental articulator, the combination with upper and lower jaw members, and pivotal connections between said members, provided with means for permitting mandibular movements, of an inclined bearing surface connected with one of said members, and provided with cam faces, a centering recess, a projection carried by the other jaw member for engaging said bearing surface, cam faces, and recess, and a spring connected with one of said jaw members at one end, a hook-shaped connection secured to the other jaw member, and extending around the axis of said pivotal connections, and engaging the other end of the spring.

8. In a dental articulator, the combination with upper and lower jaw members, and pivotal connections between them, provided with means for permitting lateral and fore and aft mandibular movements, of an inclined supporting surface on one of said jaw members provided with cam faces extending fore and aft, and forming a fore and aft centering groove between said cam faces and groove, being inclined downwardly from the rear toward the front of the articulator, a projection carried by the other jaw member for engaging said cam faces and groove, and means for changing the angularities of said cam faces and groove to provide lateral and fore and aft paths for said projection of varying angularities.

9. In a dental articulator, the combination with upper and lower jaw members, and pivotal connections between them, provided with means for permitting lateral mandibular movements, a wear plate adjustably supported on one of said jaw members and provided with cam faces forming a centering recess between them, a projection secured to the other jaw member for engaging said cam faces and recess, and means for securing said wear plate in different angular positions, to vary the angle of the cam paths traversed by said projection, upon said cam faces during lateral mandibular movements.

10. In a dental articulator, the combination with upper and lower jaw members, and pivotal connections between them, provided with means for permitting lateral and fore and aft mandibular movements, a wear plate carried by one of said jaw members and provided with cam faces, extending fore and aft, and forming a fore and aft centering groove between them, said faces and groove being inclined downwardly from the rear toward the front edge of said wear plate, means for supporting said wear plate adjustably with respect to its connected jaw, permitting the angle of said cam faces and groove to be varied, means for securing said wear plate rigidly in its adjusted position, and a projection carried by the other jaw member for engaging said cam faces and groove.

11. In a dental articulator, the combination with upper and lower jaw members, and pivotal connections between them, provided with means for permitting lateral and fore and aft mandibular movements, a wear plate carried by one of said jaw members and provided with cam faces, extending fore and aft, and forming a fore and aft centering groove between them, said faces and groove being inclined downwardly from the rear toward the front edge of said wear plate, said wear plate being connected with said jaw member by pivotal connection having its axis extending transversely of the articulator, means for clamping said wear plate in its adjusted position, and a projection on the other jaw member for engaging said cam faces and groove.

12. In a dental articulator, the combination with upper and lower jaw members, and pivotal connections between them, provided with means for permitting lateral and fore and aft mandibular movements, a wear plate carried by one of said jaw members and provided with cam faces, extending fore and aft, and forming a fore and aft centering groove between them, said faces and groove being inclined downwardly from the rear toward the front edge of said wear plate, said wear plate being detachable from said jaw member, means for securing said wear plate rigidly with respect to said jaw member, and a projection on the other jaw member for engaging said cam faces and said centering groove.

13. In a dental articulator the combination with upper and lower jaw members, said lower jaw member having a vertically disposed rear portion provided at opposite sides with slotted portions said upper jaw member having pivotal portions engaging said slotted portions, said lower jaw member being provided with downwardly and forwardly inclined supporting surface, located between said slotted portions and between a line passing through the axes of said pivotal portions and the forward ends of said jaw members, said supporting surface being provided with centering depression, and cam faces on opposite sides thereof, and a projection carried by the upper jaw for engaging said centering depression and cam faces.

14. In a dental articulator the combination with upper and lower jaw members, said lower jaw member having a vertically disposed rear portion provided at opposite sides with slotted portions said upper jaw member having pivotal portions engaging said slotted portions, said lower jaw member being provided with a downwardly and forwardly inclined supporting surface, located between said slotted portions and between a line passing through the axes of said pivotal portions and the forward ends of said jaw members, said supporting surface being provided with a fore and aft inclined centering groove and fore and aft and laterally inclined cam faces on opposite sides of said groove, an da projection carried by the upper jaw and adapted to engage said centering groove, and cam faces.

15. In a dental articulator the combination with a lower jaw member comprising a horizontal portion and a vertically disposed portion adjacent to the rear thereof provided at opposite sides with fore and aft inclined condyle slots, and an upper jaw member provided with laterally extending pivot portions engaging said condyle slots, of a supporting surface provided on said lower jaw member located substantially centrally between said condyle slots and between a line passing through the axes of the said pivot portions and the front ends of the jaw members, said surface being inclined downwardly from the rear forwardly and being provided with a longitudinal inclined centering groove formed by forwardly and laterally inclined cam faces, and a projection carried by the upper jaw member for engaging said groove and cam faces.

In testimony whereof I affix my signature.

WILLIAM MONELL STANBROUGH.